(12) United States Patent
Reytier et al.

(10) Patent No.: US 10,892,511 B2
(45) Date of Patent: Jan. 12, 2021

(54) STAND-ALONE SYSTEM FOR CLAMPING A HIGH-TEMPERATURE SOEC/SOFC STACK

(71) Applicant: COMMISSARIAT A L'ENERGIE ATOMIQUE ET AUX ENERGIES ALTERNATIVES, Paris (FR)

(72) Inventors: Magali Reytier, Villard de Lans (FR); Charlotte Bernard, Contamine sur Arve (FR); Pascal Giroud, Saint Martin d'uriage (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 172 days.

(21) Appl. No.: 16/062,373

(22) PCT Filed: Dec. 12, 2016

(86) PCT No.: PCT/EP2016/080655
§ 371 (c)(1),
(2) Date: Jun. 14, 2018

(87) PCT Pub. No.: WO2017/102657
PCT Pub. Date: Jun. 22, 2017

(65) Prior Publication Data
US 2019/0013539 A1 Jan. 10, 2019

(30) Foreign Application Priority Data
Dec. 15, 2015 (FR) ...................................... 15 62384

(51) Int. Cl.
*H01M 8/248* (2016.01)
*H01M 8/2428* (2016.01)
(Continued)

(52) U.S. Cl.
CPC ............... *H01M 8/248* (2013.01); *C25B 1/00* (2013.01); *C25B 1/08* (2013.01); *C25B 9/04* (2013.01);
(Continued)

(58) Field of Classification Search
CPC .... H01M 8/248; H01M 8/028; H01M 8/2428; H01M 8/2465; H01M 8/0273;
(Continued)

(56) References Cited

U.S. PATENT DOCUMENTS

2002/0142204 A1 10/2002 Prediger et al.
2006/0110647 A1* 5/2006 Sherman ............. H01M 8/2432
429/459
(Continued)

FOREIGN PATENT DOCUMENTS

EP 2 595 231 A2 5/2013
EP 2 647 076 A1 10/2013
(Continued)

OTHER PUBLICATIONS

International Search Report dated Apr. 10, 2017 in PCT/EP2016/080655 filed Dec. 12, 2016.
(Continued)

*Primary Examiner* — Gary D Harris
(74) *Attorney, Agent, or Firm* — Oblon, McClelland, Maier & Neustadt, L.L.P.

(57) ABSTRACT

A system for clamping a high-temperature SOEC/SOFC stack, including: an upper clamping plate and a lower clamping plate between which the stack can be clamped, each plate including at least one clamping orifice; at least one clamping rod configured to extend through clamping orifices in the upper and lower clamping plates to allow them to be assembled; a clamping mechanism level with each clamping orifice, configured to interact with the at least one
(Continued)

clamping rod; and at least one electrically insulating plate configured to be located between the stack and at least one of the upper and lower clamping plates.

16 Claims, 4 Drawing Sheets (51) Int. Cl.
*C25B 9/04* (2006.01)
*C25B 9/20* (2006.01)
*C25B 1/08* (2006.01)
*C25B 1/00* (2006.01)
*H01M 8/028* (2016.01)
*H01M 8/0273* (2016.01)
*H01M 8/124* (2016.01)
*H01M 8/2465* (2016.01)

(52) U.S. Cl.
CPC ............. *C25B 9/203* (2013.01); *H01M 8/028* (2013.01); *H01M 8/2428* (2016.02); *H01M 8/0273* (2013.01); *H01M 8/2465* (2013.01); *H01M 2008/1293* (2013.01); *Y02E 60/36* (2013.01)

(58) Field of Classification Search
CPC .... H01M 2008/1293; C25B 1/00; C25B 1/08; C25B 9/04; C25B 9/203; Y02E 60/366

USPC ......................................................... 429/465
See application file for complete search history.

(56) References Cited

U.S. PATENT DOCUMENTS

| | | |
|---|---|---|
| 2010/0012503 A1 | 1/2010 | Hinatsu et al. |
| 2011/0076585 A1 | 3/2011 | Edmonston et al. |
| 2012/0325654 A1 | 12/2012 | Le Gallo et al. |
| 2013/0130148 A1 | 5/2013 | Haltiner, Jr. et al. |
| 2013/0177829 A1 | 7/2013 | Homma |
| 2014/0242492 A1 | 8/2014 | Edmonston et al. |
| 2015/0299872 A1* | 10/2015 | Kirkpatrick ............. C25B 15/08 205/628 |
| 2015/0311559 A1 | 10/2015 | Tsukamoto et al. |

FOREIGN PATENT DOCUMENTS

| | | |
|---|---|---|
| JP | 7-145492 A | 6/1995 |
| JP | 3465379 B2 | 11/2003 |
| JP | 2007-294330 A | 11/2007 |
| WO | WO 01/13450 A2 | 2/2001 |
| WO | WO 2012/073640 A1 | 6/2012 |

OTHER PUBLICATIONS

French Preliminary Search Report dated Aug. 23, 2016 in Patent Application No. 1562384 filed Dec. 15, 2015.

* cited by examiner

STAND-ALONE SYSTEM FOR CLAMPING A HIGH-TEMPERATURE SOEC/SOFC STACK

TECHNICAL DOMAIN

This invention relates to the general field of High Temperature Electrolysis (HTE) of water, particularly High Temperature Steam Electrolysis (HTSE), and electrolysis of carbon dioxide ($CO_2$), or even high temperature co-electrolysis (HTE) of water with carbon dioxide ($CO_2$).

More precisely, the invention relates to the domain of high temperature Solid Oxide Electrolyser Cells (SOEC).

More precisely, the invention relates to the domain of high temperature Solid Oxide Fuel Cells (SOFC).

Thus, more generally, the invention relates to the field of SOEC/SOFC type solid oxide stacks operating at high temperature.

More precisely, the invention relates to a self-contained clamping system for an SOEC/SOFC type solid oxide stack operating at high temperature, an assembly comprising an SOEC/SOFC type solid oxide stack and a clamping system for this stack, and an associated method of fabricating such a stack.

STATE OF PRIOR ART

In the framework of an SOEC type high temperature solid oxides electrolyser, the objective is to use an electric current within a single electrochemical device to transform steam ($H_2O$) into dihydrogen ($H_2$) and into dioxygen ($O_2$), and/or also to transform carbon dioxide ($CO_2$) into carbon monoxide (CO) and dioxygen ($O_2$). In the framework of an SOFC type high temperature solid oxide fuel cell, the inverse operation is used to generate electrical current and heat, with a supply composed of dihydrogen ($H_2$) and dioxygen ($O_2$), typically in air and in natural gas, namely by methane ($CH_4$). For reasons of simplicity, the following description applies more particularly to the operation of an SOEC type high temperature solid oxide electrolyser, electrolysing water. However, this operation is applicable to the electrolysis of carbon dioxide ($CO_2$), or even to high temperature co-electrolysis (HTE) of water with carbon dioxide ($CO_2$). Furthermore, this operation can be transposed to the case of an SOFC type high temperature solid oxide fuel cell.

To achieve electrolysis of water, it is advantageous if it is done at high temperature, typically between 600 and 1000° C., because it is more advantageous to electrolyse steam than liquid water and because some of the energy necessary for the reaction can be added by heat that is less expensive than electricity.

In order to achieve high temperature electrolysis (HTE) of water, an SOEC type of high temperature solid oxides electrolyser is composed of a stack of elementary patterns each comprising a solid oxides electrolysis cell or an electrochemical cell composed of three anode/electrolyte/cathode layers superposed on each other, and interconnection plates made of metallic alloys, also called bipolar or interconnection plates. Each electrochemical cell is squeezed between two interconnection plates. A high temperature SOEC type solid oxides electrolyser is then an alternating stack of electrochemical cells and interconnectors. An SOFC type high temperature solid oxide fuel cell is composed of the same type of stack of elementary patterns. Since this high temperature technology is reversible, the same stack can function in electrolysis mode and produce hydrogen and oxygen from water and electricity, or in fuel cell mode and generate electricity from hydrogen and oxygen.

Each electrochemical cell corresponds to an electrolyte/electrodes assembly that is typically a multi-layer assembly made of ceramic in which the electrolyte is formed from a central ion-conducting layer, this layer being solid, dense and leak tight, and squeezed between two porous layers forming the electrodes. Note that additional layers may exist but are useful only to improve one or several of the previously described layers.

Interconnection, electrical and fluid devices are electronic conductors that make an electrical connection between each electrochemical cell with an elementary pattern in the stack of elementary patterns, guaranteeing electrical contact between one face and the cathode of a cell, and between the other face and the anode of the next cell, and make a fluid connection thus combining production in each of the cells. The interconnectors thus perform functions to carry electrical current in and out and delimit gas circulation compartments, for distribution and/or collection.

More precisely, the main function of interconnectors is to pass electrical current and also gas circulation close to each cell (namely injected steam, extracted hydrogen and oxygen for HTE electrolysis; air and fuel including injected hydrogen and extracted water for an SOFC cell), and to separate the anode and cathode compartments of two adjacent cells, that are gas circulation compartments on the side of the anodes and cathodes of cells respectively.

In particular, for a high temperature SOEC type solid oxide electrolyser, the cathode compartment contains steam and hydrogen produced by the electrochemical reaction, while the anode compartment contains a draining gas if present, and oxygen, also produced by the electrochemical reaction. For a high temperature type SOFC solid oxide fuel cell, the anode compartment contains fuel, while the cathode compartment contains oxidant.

The high temperature steam electrolysis (HTSE) is made by injecting steam ($H_2O$) in the cathode compartment. Under the effect of the electrical current applied to the cell, water molecules in the form of steam are dissociated at the interface between the hydrogen electrode (cathode) and the electrolyte: this dissociation produces dihydrogen ($H_2$) gas and oxygen ($O^{2-}$) ions. The dihydrogen ($H_2$) is collected and evacuated outside the hydrogen compartment. The oxygen ions ($O^{2-}$) migrate through the electrolyte and recombine into dioxygen ($O_2$) at the interface between the electrolyte and the oxygen electrode (anode). A draining gas such as air can circulate at the anode and thus collect the oxygen generated in gas form at the anode.

A solid oxide fuel cell (SOFC) is made to function by injecting air (oxygen) into the cathode compartment of the cell and hydrogen into the anode compartment. Oxygen in the air will dissociate into $O^{2-}$ ions. These ions will migrate in the electrolyte from the cathode to the anode to oxidise hydrogen and form water and simultaneously generate electricity. Steam is located in the dihydrogen ($H_2$) compartment in SOFC cells and in SOEC electrolysis. Only the polarity is inverted.

Figure 1:
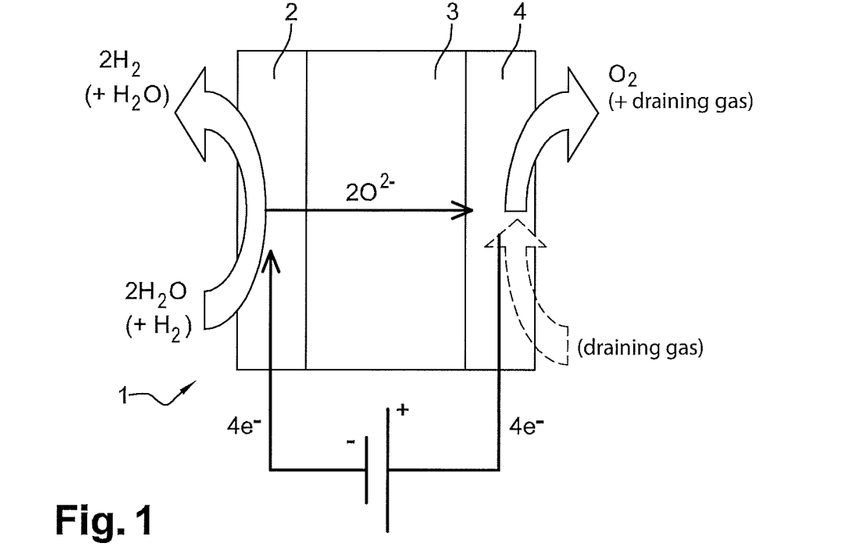
FIG. 1 is a diagrammatic view showing the operating principle of a high temperature solid oxide electrolyser (SOEC).

As an illustration, FIG. 1 represents a diagrammatic view showing the operating principle of a high temperature SOEC type solid oxides electrolyser. The function of such an electrolyser is to transform steam into hydrogen and oxygen according to the following electrochemical reaction:

This reaction takes place electrochemically in the electrolyser cells. As shown diagrammatically on FIG. 1, each elementary electrolysis cell 1 is formed from a cathode 2 and an anode 4, placed on each side of a solid electrolyte 3. The two electrodes (cathode and anode) 2 and 4 are electronic and/or ionic conductors, made of a porous material, and the electrolyte 3 is gas tight, an electronic insulator and an ionic conductor. In particular, the electrolyte 3 can be an anionic conductor; more precisely an anionic conductor of $O^{2-}$ ions and the electrolyser is then called an anionic electrolyser, in opposition to protonic electrolytes ($H^+$).

Electrochemical reactions take place at the interface between each electronic conductor and the ionic conductor.

The half-reaction at the cathode 2 is as follows:

$$2H_2O+4e^- \rightarrow 2H_2+2O^2.$$

The half-reaction at the anode 4 is as follows:

$$2O^{2-} \rightarrow O_2+4e^-.$$

The electrolyte 3, intercalated between the two electrodes 2 and 4, is the migration location of $O^{2-}$ ions under the effect of the electrical field created by the potential difference imposed between the anode 4 and the cathode 2.

As illustrated between parentheses on FIG. 1, steam at the cathode inlet may be accompanied by hydrogen $H_2$ and the hydrogen produced and recovered at the outlet may be accompanied by steam. Similarly, as shown by the dotted lines, a draining gas such as air can be injected at the inlet to evacuate the oxygen produced. Another function of injection of a draining gas is to act as a temperature regulator.

An elementary electrolyser or electrolysis reactor is composed of an elementary cell as described above, with a cathode 2, an electrolyte 3, an anode 4 and two interconnectors that perform electrical, hydraulic and thermal functions.

It is known that the hydrogen and oxygen flows produced can be increased by stacking several elementary electrolysis cells on each other, separating them by interconnectors. The assembly is positioned between two end interconnection plates that support the electrical power supplies and gas supplies to the electrolyser (electrolysis reactor).

An high temperature SOEC type solid oxides electrolyser thus generally comprises a plurality of electrolysis cells stacked on each other, each elementary cell being composed of an electrolyte, a cathode and an anode, the electrolyte being intercalated between the anode and the cathode.

As indicated above, the fluidic and electrical interconnection devices that are in contact with one or more electrodes usually perform functions to bring in and to collect electrical current and delimit one or more gas circulation compartments.

Thus, the function of the so-called cathode compartment is the distribution of electrical current and steam and recovery of hydrogen at the cathode in contact.

Thus, the function of the so-called anode compartment is the distribution of electrical current and the recovery of oxygen produced at the anode in contact, possibly using a draining gas.

Figure 2:
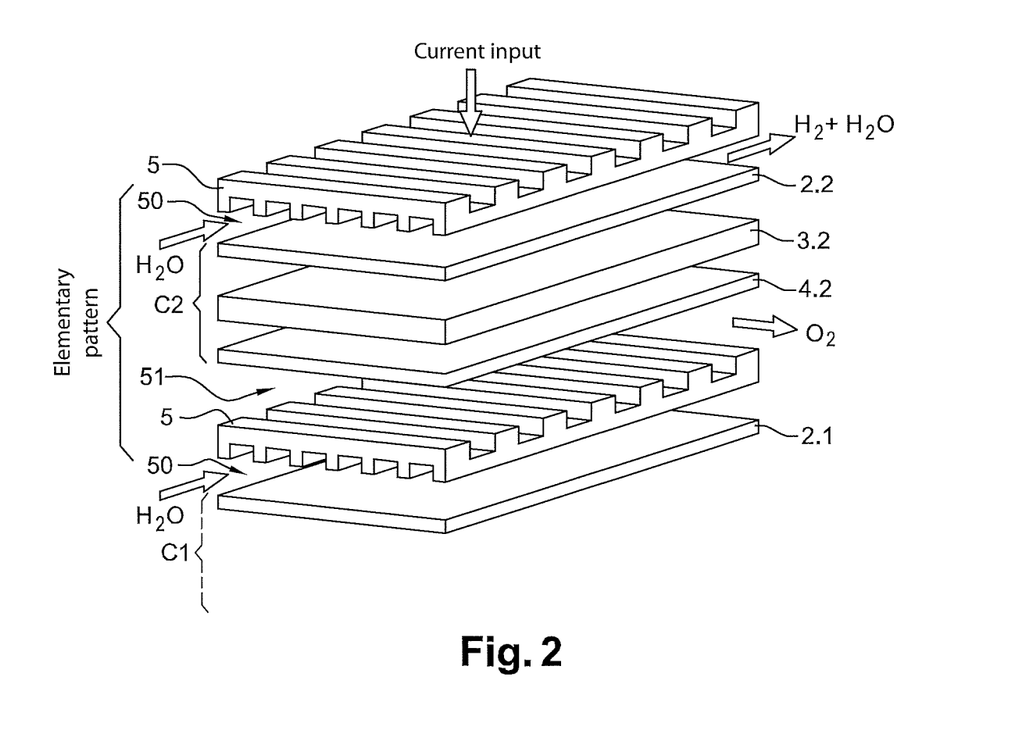
FIG. 2 is a diagrammatic exploded view of a part of a high temperature solid oxide electrolyser (SOEC) comprising interconnectors according to prior art.

FIG. 2 shows an exploded view of elementary patterns of a high temperature SOEC type solid oxides electrolyser according to prior art. This electrolyser comprises a plurality of elementary electrolysis cells C1, C2 of the SOEC (solid oxides) type, stacked in alternation with the interconnectors 5. Each cell C1, C2 is composed of a cathode 2.1, 2.2 and an anode (only the anode 4.2 of cell C2 is shown), between which there is an electrolyte (only electrolyte 3.2 of cell C2 is shown).

The interconnector 5 is a metal alloy component that separates the cathode 50 and anode 51 compartments, defined by the volumes between the interconnector 5 and the adjacent cathode 2.1 and between the interconnector 5 and the adjacent anode 4.2 respectively. It also distributes gas to the cells. Steam is injected into each elementary pattern in the cathode compartment 50. Hydrogen produced and residual steam at the cathode 2.1, 2.2 are collected in the cathode compartment 50 downstream from the cell C1, C2 after dissociation of steam by the cell. Oxygen produced at the anode 4.2 is collected in the anode compartment 51 downstream from the cell C1, C2 after dissociation of steam by the cell. The interconnector 5 carries current between cells C1 and C2 by direct contact with the adjacent electrodes, in other words between the anode 4.2 and the cathode 2.1.

Since operating conditions of a high temperature SOEC solid oxides electrolyser are very similar to operating conditions of an SOFC (solid oxide fuel cell), the same technological conditions are applicable.

Thus, correct operation of such SOEC/SOFC type solid oxide stacks operating at high temperature is only possible if the points mentioned below are satisfied.

Firstly, electrical insulation between two successive interconnectors is necessary, otherwise the electrochemical cell might be short circuited, and good electrical contact and a sufficiently large contact area are necessary between a cell and an interconnector. The lowest possible pure resistance is required between cells and interconnectors. This depends on materials facing each other and also on the degree of clamping of the stack.

Furthermore, the anode and cathode compartments must be leak tight, otherwise the gases produced will recombine thus reducing the efficiency and even more importantly, creating hot spots causing damage to the stack. Once again, this leak tightness depends on the design of the seals and the materials used, bus also on the degree of clamping of the stack.

Finally, it is essential to have good distribution of gases at the inlet and at the product recovery point, otherwise there will be a loss of efficiency, non-homogeneity of the pressure and temperature within the elementary patterns, or even unacceptable damage to the electrochemical cells.

Furthermore, another important constraint is that thermal operating conditions of an SOFC (solid oxide fuel cell) in which the hydrogen oxidation reaction is highly exothermic, or of a high temperature SOEC (solid oxides electrolyser) in which the global reaction may be either exothermic or endothermic or globally isothermal (autothermal operation) depending on the operating potential, should be optimally managed.

The selected operating point fixes the temperature conditions of electrochemical cells.

The energy $\Delta H$ necessary for dissociation of the input molecule, namely $H_2O$ and/or $CO_2$ for electrolyses performed at high temperature can be provided by electricity and/or heat. The thermal energy Q brought in is then defined as a function of the voltage U at the terminals of each cell and the current intensity I by the following equation: $Q=\Delta H \times (I/2F) - U \times I$, in which F represents the Faraday constant.

Thus, as mentioned above, three operating conditions are defined for a high temperature SOEC (solid oxides electrolyser), corresponding to three different thermal conditions for the stack:

autothermal mode: the imposed voltage $U_{imp}$ is equal to $\Delta H/2F$. Heat consumed by the dissociation reaction is fully compensated by the different electrical resistances in the electrolyser. The electrolyser does not require any particular temperature management, and its temperature remains stable;

endothermic mode: the imposed voltage $U_{imp}$ is less than $\Delta H/2F$. The electrolyser consumes more heat than electrical losses within it. This operating mode can cause large temperature variations within the stack;

exothermic mode: the imposed voltage $U_{imp}$ is greater than $\Delta H/2F$. The electrolyser then consumes less heat than electrical losses through the Joule effect. This operating mode also causes large temperature variations within the stack;

However, operation of an SOFC (solid oxide fuel cell) under hydrogen is always exothermic.

However, it should be noted that precautions have to be taken for an SOFC (solid oxide fuel cell) supplied with natural gas, and particularly methane ($CH_4$). The internal reforming reaction, namely $CH_4 + H_2O \rightarrow 3H_2 + CO$, catalysed by the Nickel-zirconia cermet of the $H_2$ electrode, is strongly endothermic, while the hydrogen oxidation reaction within the stack is strongly exothermic. Therefore the cell mode may be either endothermic or exothermic and therefore also cause large temperature variations within the stack.

Thus, it can be seen that there are many functions to be performed on SOEC/SOFC type stacks and that they are coupled together. In particular, the degree of clamping of the stack affects the performance of several functions, but control of this degree of clamping can depend on temperature management of the stack. An increase in the operating temperature due to differential expansions within the set of components can cause either a loss of tightness, and therefore a loss of leak tightness and poor electrical contact, or an increase in the degree of clamping, possibly damaging the electrochemical cell if it is too tight.

Furthermore, temperature cycles may take place within the stack between ambient temperature and a temperature of about 800° C. during on/off type cycles and the degree of tightness must not vary too much during this thermal transient, otherwise leak tightness can be degraded and a damaging thermomechanical cycle may also be introduced.

Solutions have already been envisaged in prior art to satisfy these needs and overcome these disadvantages. Classically, the most frequently used solution consists of placing a screw/nut type system associated with a set of elastic washers or springs in a cold zone, so as to elastically compensate for any deformation and to keep the force practically constant.

However, there are several disadvantages in this transfer to a cold zone, as described below. Firstly, it requires a long transfer by clamping rods outside the hot zone to maintain a temperature gradient between the operating temperature typically of the order of 800° C., and the clamping zone of washers required to remain elastic and therefore at lower temperature, typically of the order of 20 to 300° C. Furthermore, this transfer length outside the hot zone can be problematic, particularly in the framework of operation under pressure within a containment. This has the consequence of considerably complicating the passage of these clamping columns because it is then necessary to manage either the transfer of the clamping force outside the containment under pressure and at high temperature, typically 800° C., for example by bellows; or to maintain the force within a containment under pressure cooled typically to 20 to 300° C., thus leading to a volume under much higher pressure.

PRESENTATION OF THE INVENTION

The purpose of the invention is to at least partially remedy the needs mentioned above and the disadvantages of embodiments according to prior art.

It aims particularly at implementation of a particular design of a high temperature SOEC (electrolysis stack) or an SOFC (fuel cell), and more specifically to design a self-contained clamping system for such a stack that enables application of the force during fabrication of the stack and keeping this force constant, including during operation at high temperature.

Thus the purpose of one of the aspects of the invention is a self-contained clamping system for SOEC/SOFC type solid oxide stacks operating at high temperature, characterised in that it comprises:

an upper clamping plate and a lower clamping plate between which the SOEC/SOFC type solid oxide stack will be clamped, each plate comprising at least one clamping orifice, at least one clamping rod that will extend through a clamping orifice in the upper clamping plate and through a corresponding clamping orifice in the lower clamping plate to enable assembly of the upper and the lower clamping plates to each other, clamping means at each clamping orifice of the upper and lower clamping plates designed to cooperate with said at least one clamping rod to assemble the upper and lower clamping plates to each other, at least one electrical insulation plate designed to be located between the SOEC/SOFC type solid oxide stack and at least one of the upper and lower clamping plates.

Advantageously, the clamping system according to the invention is of the "Plug and Play" (PnP) type because it enables fast installation of the stack inside a system and starting it without need to manage its tightness during operation, particularly at high temperature at about 800° C., despite differential expansions of the different components.

The clamping system according to the invention may also comprise one or several of the following characteristics taken in isolation or in any technically possible combination.

The upper clamping plate and the lower clamping plate are preferably made of austenitic refractory steel, particularly AISI 310 type steel.

Furthermore, the upper clamping plate and the lower clamping plate may each be between 20 and 30 mm thick particularly of the order of 25 mm.

Said at least one clamping rod is preferably threaded. Furthermore, the clamping means may comprise at least one second clamping nut at each clamping orifice of either the upper or lower clamping plate, designed to cooperate with said at least one clamping rod inserted through the clamping orifice. The clamping means may also comprise at least one first clamping nut at each clamping orifice of the other among the upper and lower clamping plates, associated with at least one clamping washer designed to cooperate with said at least one clamping rod inserted through the clamping orifice. Said at least one clamping washer may in particular be located between said at least one clamping nut and the other among the upper and lower clamping plates.

Furthermore, said at least one clamping rod and said at least one first and second clamping nuts are preferably made from a super alloy based on nickel, particularly of the Inconel 625 type. In this way, it may be possible to guarantee elastic behaviour and therefore avoid any creep or relaxation despite the temperatures considered.

Furthermore, said at least one clamping washer is preferably made of refractory austenitic steel, particularly the AISI 310 type. The thickness of the clamping washer(s) can advantageously be adjusted as a function of the number of electrochemical cells present in the SOEC/SOFC type solid oxide stack.

Said at least one clamping rod is advantageously cylindrical in shape, preferably with a diameter greater than or equal to 16 mm.

Furthermore, each of the upper and lower clamping plates may comprise at least two clamping orifices, particularly four clamping orifices. The clamping system may then comprise:
- at least two clamping rods, particularly four clamping rods, each of which will extend through a clamping orifice in the upper clamping plate and through a corresponding clamping orifice in the lower clamping plate to enable assembly of the upper and the lower plates to each other,
- clamping means at each clamping orifice in the upper and lower clamping plates designed to cooperate with said at least two clamping rods to assemble the upper and lower clamping plates to each other, Said at least two clamping rods are preferably threaded, and the clamping means may comprise a second clamping nut at each clamping orifice in one of the upper and lower clamping plates, designed to cooperate with the clamping rod inserted through the clamping orifice, and may comprise a first clamping nut associated with a clamping washer at each clamping orifice in the other among the upper and lower clamping plates, designed to cooperate with the clamping rod inserted through the clamping orifice, the clamping washer being located particularly between the first clamping nut and the other among the upper and the lower clamping plates.

Furthermore, said at least one electrical insulation plate is preferably made of mica. This electrical insulation plate acts as an electrical insulating packing between the SOEC/SOFC type solid oxide stack and one of the upper and lower clamping plates, particularly the upper clamping plate. If this plate is not present and since the clamping system is preferably metallic, it would cause a global short circuit between the top and the bottom of the stack.

Furthermore according to one variant, the clamping means may comprise at least one insulating washer and at least one insulating tube through which said at least one clamping rod inserted through the clamping orifice can pass, in addition to said at least one second clamping nut, at each clamping orifice in one of the upper and lower clamping plates, designed to enable cooperation in assembly between said at least one clamping rod and said at least one second clamping nut, said at least one insulating tube being located particularly between said one of the upper and lower clamping plates and said at least one insulating washer, said at least one insulating washer being located particularly between said at least one insulating tube and said at least one second clamping nut.

Furthermore, according to one embodiment of the invention, the clamping system may comprise two electrical insulation plates designed to be positioned between the SOEC/SOFC type solid oxide stack and the upper clamping plate, and between the SOEC/SOFC type solid oxide stack and the lower clamping plate.

Another purpose of the invention according to another of its aspects is an assembly characterised in that it comprises:
- an SOEC/SOFC type solid oxide stack operating at high temperature,
- a clamping system for the SOEC/SOFC type solid oxide stack as defined above.

The SOEC/SOFC type solid oxide stack may comprise
- a plurality of electrochemical cells each composed of a cathode, an anode and an electrolyte intercalated between the cathode and the anode,
- a plurality of intermediate interconnectors each formed between two adjacent electrochemical cells,
- an upper terminal plate and a lower terminal plate, between which the plurality of electrochemical cells and the plurality of intermediate interconnectors are clamped.

Each of the upper and lower terminal plates is advantageously in contact with one of the upper and lower clamping plates or in contact with an electrical insulation plate of the clamping system.

The thickness of each intermediate interconnector is preferably small, particularly less than or equal to 1 mm.

Furthermore, the upper terminal plate and the lower terminal plate may each be between 5 and 15 mm thick particularly of the order of 10 mm.

At least one metallic tube for the inlet/outlet of gases produced, and particularly at least two and particularly four inlet/outlet tubes may pass through each lower terminal plate to carry the gases produced.

Furthermore, a layer forming insulating packing may be located around each electrochemical cell and between each adjacent intermediate interconnector.

This insulating packing can advantageously help to centre each electrochemical cell and provide electrical insulation between intermediate interconnectors. It is preferably made of mica. It can also provide a support for seals, particularly made of glass.

The SOEC/SOFC type solid oxide stack may also comprise a first contact layer between the upper terminal plate and the assembly composed of the electrochemical cells and the intermediate interconnectors, and particularly a plurality of first contact layers between each hydrogen electrode of the electrochemical cells and each intermediate interconnector or the upper terminal plate, and a second contact layer between the lower terminal plate and the assembly composed of the electrochemical cells and the intermediate interconnectors, and particularly a plurality of second contact layers between each oxygen electrode of the electrochemical cells and each intermediate interconnector or the lower terminal plate.

The first and the second contact layers can advantageously improve the passage of electrical current between the intermediate interconnectors and the electrochemical cells.

Furthermore, one of the first and second contact layers may comprise a ceramic oxide layer, particular of the Lanthanum Strontium Manganite (LSM) type, and the other among the first and second contact layers may comprise a layer made of nickel, and particularly formed by a nickel grating.

The SOEC/SOFC type solid oxide stack may also comprise at least two guide columns extending through guide orifices formed in at least the upper terminal plate, the lower terminal plate, the intermediate interconnectors and the upper clamping plate, and configured to guide the SOEC/SOFC type solid oxide stack in compression during its fabrication.

Another purpose of another aspect of the invention is a method for fabrication of an SOEC/SOFC type solid oxide stack operating at high temperature, characterised in that it makes use of a clamping system as defined above, the method comprising the fabrication step by external clamping of the SOEC/SOFC type solid oxide stack through a clamping system.

The method may also comprise the step prior to the fabrication step by external clamping, to position the SOEC/SOFC type solid oxide stack between the upper and lower clamping plates of the clamping system with the presence of said at least one electrical insulation plate located between the SOEC/SOFC type solid oxide stack and at least one of the upper and lower clamping plates.

The fabrication step by external clamping advantageously includes the compression step of the SOEC/SOFC type solid oxide stack, particularly when the temperature is increased from about 20° C. to a temperature of more than 800° C.

The compression applied during the fabrication step by external clamping can be done by applying an external load, particularly a gravity load, in other words by means of a mass, or by means of a ram.

Furthermore, the compression applied during the fabrication step by external clamping may be a distributed weight equal to between 2 and 2.5 kg/(cm$^2$ of electrochemical cell).

After cooling particularly to a temperature of about 20° C. during the compression step of the SOEC/SOFC solid oxide stack, said at least one threaded rod, said at least one second clamping nut, said at least one first clamping nut and said at least one clamping washer may be put into place on the clamping system, said at least one first and second clamping nuts being brought into contact particularly without additional clamping. Note that the thickness of the stack will have advantageously reduced during the compression and temperature cycle step.

Furthermore, after placement of said at least one threaded clamping rod, said at least one second clamping nut, said at least one first clamping nut and said at least one clamping washer on the clamping system, compression of the SOEC/SOFC solid oxide stack may be interrupted, particularly by removing the external load such that the force previously applied by clamping is transferred onto the installed clamping means. The clamping means can advantageously keep the stack in compression after the external load has been removed.

The clamping system, the assembly and the fabrication method according to the invention may comprise any one of the characteristics mentioned in the description, taken in isolation or in any technically possible combination with other characteristics.

BRIEF DESCRIPTION OF THE DRAWINGS

The invention will be better understood after reading the following detailed description of non-limitative example embodiments of the invention, and an examination of the diagrammatic and partial figures in the appended drawing on which.

In all these figures, identical references may denote identical or similar elements.

Furthermore, the different parts shown on the figures are not necessarily all at the same scale, to make the figures more easily understandable.

DETAILED PRESENTATION OF PARTICULAR EMBODIMENTS

FIGS. 1 and 2 have already been described above in the part dealing with the state of prior art and the technical context of the invention. Note that for these FIGS. 1 and 2, the symbols and the arrows indicating the supply of steam $H_2O$, the distribution and recovery of dihydrogen $H_2$, oxygen $O_2$, air and electrical current, are shown for reasons of clarity and precision, to illustrate the operation of the devices represented.

Note also that all the constituents (anode/electrolyte/cathode) of a given electrochemical cell are preferably ceramics. Furthermore, the operating temperature of a high temperature SOEC/SOFC type stack is typically between 600 and 1000° C.

Furthermore, the terms "upper" and "lower" as used herein should be understood in the sense of the normal orientation of an SOEC/SOFC type stack and/or a clamping system according to the invention when in their usage configuration.

Figure 3:
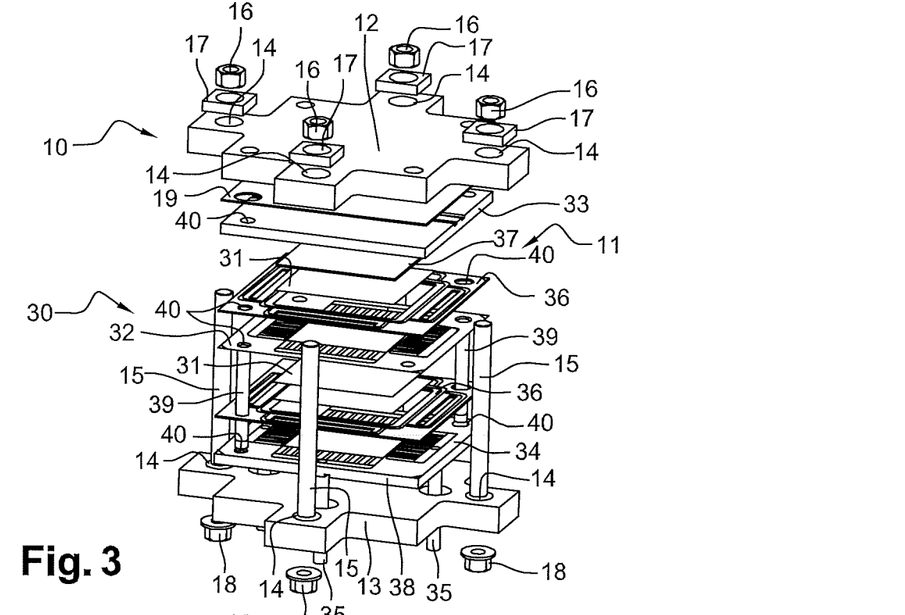
FIG. 3 is a partial perspective exploded view representing an example of an assembly comprising a high temperature SOEC/SOFC type solid oxide stack and a clamping system for this stack according to the invention.

With reference to FIG. 3 a partial perspective exploded view represents an example of an assembly 30 comprising a high temperature SOEC/SOFC type solid oxide stack 11 and a self-contained clamping system 10 for this stack 11 according to the invention.

According to the invention, the clamping system 10 comprises firstly an upper clamping plate 12 and a lower clamping plate 13, between which the SOEC/SOFC type solid oxide stack is clamped.

Each upper clamping plate 12 and lower clamping plate 13 comprises a plurality of clamping orifices 14.

Furthermore, the clamping system 10 comprises four clamping rods 15, each extending through a clamping orifice 14 in the upper clamping plate 12 and through a corresponding clamping orifice 14 in the lower clamping plate 13 to enable assembly of the upper clamping plate 12 and the lower clamping plate 13 to each other.

Advantageously, the clamping rods 15 are threaded and have a cylindrical shape with a diameter greater than or equal to 16 mm.

Furthermore, the clamping system 10 also comprises clamping means 16, 17, 18 at each clamping orifice 14 in the upper clamping plate 12 and the lower clamping plate 13 that cooperate with the clamping rods 15 to enable assembly of the upper clamping plate 12 and the lower clamping plate 13 together.

In this example in FIG. 3, these clamping means comprise a second clamping nut 18 cooperating with the corresponding clamping rod 15 inserted through the clamping orifice 14, at each clamping orifice 14 in the lower clamping plate 14. Furthermore, the clamping means comprise a first clamping nut 16 associated with a clamping washer 17, at each clamping orifice 14 in the upper clamping plate 12, cooperating with the corresponding clamping rod 15 inserted through the clamping orifice 14. As can be seen on this FIG. 3, the clamping washer 17 is located between the first clamping nut 16 and the upper clamping plate 12.

Advantageously, the upper clamping plate 12 and the lower clamping plate 13 are made of AISI 310 type austenitic refractory steel. Each is of the order of 25 mm thick.

Furthermore, the clamping rods 15 and the first 16 and second 18 clamping nuts are advantageously made of an Inconel 625 type nickel-based super alloy. In this way, it is possible to guarantee elastic behaviour and therefore avoid any creep or relaxation despite the envisaged temperatures.

The clamping washers 17 are made of AISI 310 type austenitic refractory steel. The thickness of the clamping washers 17 can be adjusted as a function of the number of electrochemical cells 31 present in the SOEC/SOFC type solid oxide stack 11. Advantageously, the invention can compensate for the difference in expansion between the clamping rods 15 made of an Inconel 625 type nickel-based super alloy and the SOEC/SOFC type solid oxide stack 11 by the large expansion of the lower 12 and upper 13 clamping plates and the clamping washers 17 made of AISI 310 type austenitic refractory steel.

Furthermore, in this example in FIG. 3, the clamping system according to the invention also comprises an electrical insulation plate 18 between the SOEC/SOFC type solid oxide stack 11 and the upper clamping plate 12.

This electrical insulation plate 19 is advantageously made of mica. This electrical insulation plate 19 acts as an electrical insulating packing between the SOEC/SOFC type solid oxide stack 11 and the upper clamping plate. If this plate is not present and since the clamping system 10 is preferably metallic, it would cause a global short circuit between the top and the bottom of the stack 11.

Furthermore, the SOEC/SOFC type solid oxide stack 11 comprises firstly a plurality of electrochemical cells 31 each composed of a cathode, an anode and an electrolyte intercalated between the cathode and the anode, and a plurality of intermediate interconnectors 32 each arranged between two adjacent electrochemical cells 31.

Furthermore, the stack 11 also comprises an upper terminal plate 33 and a lower terminal plate 34, between which the plurality of electrochemical cells 31 and the plurality of intermediate interconnectors 32 are clamped.

In this example in FIG. 3, the upper terminal plate 33 is in contact with the electrical insulation plate 19 of the clamping system 10, while the lower terminal plate 34 is in contact with the lower clamping plate 13 of the clamping system 10.

Not that the thickness of each intermediate interconnector 32 is preferably small, particularly less than or equal to 1 mm.

Furthermore, the upper terminal plate 33 and the lower terminal plate 34 are each of the order of 10 mm thick.

Furthermore, four metallic inlet/outlet tubes 35 pass through each lower terminal plate 34 to carry the gases produced.

Furthermore, a layer forming insulating packing 36 is located around each electrochemical cell 31 and between each adjacent intermediate interconnector 32. This insulating packing 36 can advantageously help to centre each electrochemical cell 31 and provide electrical insulation between intermediate interconnectors 32. It is preferably made of mica. It can also provide a support for seals, particularly made of glass.

As shown, the SOEC/SOFC type solid oxide stack 11 also comprises a first contact layer 37 between the upper terminal plate 33 and the assembly formed by the electrochemical cells 31 and the intermediate interconnectors 32, and a second contact layer 38 between the lower terminal plate 34 and the assembly formed by the electrochemical cells 31 and the intermediate interconnectors 32. More precisely, although not shown, the stack 11 comprises a first contact layer 37 between each $H_2$ electrode of the electrochemical cells 31 and each intermediate connector 32 or upper terminal plate 33, and comprises a second contact layer 38 between each $O_2$ electrode of the electrochemical cells 31 and each intermediate connector 32 or lower terminal plate 34.

The first 37 and second 38 contact layers can advantageously improve the passage of electrical current between the intermediate interconnectors 32 and the electrochemical cells 31.

In this example in FIG. 3, the first contact layer 37 is formed from a nickel grating while the second contact layer 38 is a Lanthanum Strontium Manganite (LSM) type ceramic oxide layer.

Furthermore, the SOEC/SOFC type solid oxide stack 11 also comprises two guide columns 39 extending through guide orifices 40 formed in the upper terminal plate 33, the lower terminal plate 34, the intermediate interconnectors 32, the insulating packing 36 and the upper clamping plate 12. These guide columns 39 are advantageously configured to guide the SOEC/SOFC type solid oxide stack 11 in compression, by compression during fabrication.

Moreover, it should be noted that that the set of steel materials used in the stack 11 are ferritic steels, particularly of the Crofer, AISI 441 and/or AISI 430 type, principally to adapt coefficients of expansion between glass seals, cells 31 and interconnectors 32.

It is also worth noting for guidance, the average order of magnitude of coefficients of expansion a used between 20 and 800° C. for the various materials mentioned above, namely:

ferritic steel: $\alpha=12\times10^{-6}$,
nickel and Inconel 625 grating: $\alpha=16\times10^{-6}$,
AISI 310 type austenitic steel: $\alpha=18\times10^{-6}$, and
lanthanum strontium manganite (LSM): $\alpha=12\times10^{-6}$.

Depending on the thicknesses of each of the components of the stack 11, the thickness of the clamping washers 17 made of AISI 310 steel is chosen so as to guarantee that all expansions of parts located between the clamping nuts 16 and 18, corresponding to the sum of the ($\alpha\times$thickness) product for each component is equal to or slightly more than the expansion of the threaded clamping rods 15. This guarantees that initial clamping will be maintained regardless of the temperature variation, or even provide slight additional clamping as the temperature increases from 20 to 800° C. Thus, for a conclusive test result of the electrical contact and leak tightness of an assembly 30 according to the invention, clamping washers 17 made of AISI 310 are about 10 mm thick for 25 electrochemical cells 31.

Due to the invention, it is thus possible to manage clamping of the stack 11 and to hold its temperature without any transfer into a cold zone. The choice of materials and thicknesses of components of the clamping system 10 can hold this clamping force regardless of the temperature, despite differential expansions of each of the components of the stack 11. Furthermore, the sizing of the clamping system 10 makes it possible for all strains to remain elastic to guarantee possible temperature cycles. Moreover, the clamping system 10 can protect the stack 11 from electrical short circuits in the remainder of an installation in which it is installed.

More specifically, the invention can advantageously obtain a self-contained clamping system 10 capable of operating over the entire temperature range from 20 to 900° C., and maintain the initial clamping applied during fabrication over the entire temperature range from 20 to 900° C. The invention can advantageously be based on compensation of the difference in expansion between the nickel-based super alloy and ferritic steel by austenitic refractory steel. It does not use a transfer to a cold zone, guaranteeing a compact stack size without a temperature gradient to be maintained. Furthermore, the invention enables displacement of the stacks 11 obtained from one fabrication installation to another fabrication installation for their operation. The invention can thus be used to fabricate stacks 11 in the chain independently of their use. Furthermore, the clamping system 10 according to the invention is flexible, so that the number of electrochemical cells 31 in the stack 11 can be adapted by adjusting the thickness of the austenitic refractory steel clamping washers 17. Finally, the clamping system 10 according to the invention makes it possible to manage electrical insulation of the stack 11 in the case of an installation of several stacks 11 simultaneously.

Moreover, depending on the required electrical installation for the stack 11, or even the combination of several stacks 11, different configurations can be envisaged for the electrical insulation between external clamping and the stack 11.

Thus, FIGS. 4 to 7 are partial perspective exploded views, each representing variant embodiments of an assembly 30 comprising a high temperature SOEC/SOFC type solid oxide stack 11 and a clamping system 10 for this stack 11 according to the invention, with insulation of the clamping linkage.

More precisely, as can be seen on these FIGS. 4 to 7, the clamping means 16, 17, 18, 20, 21 may comprise an insulating washer 20 and an insulating tube 21 through which a corresponding threaded clamping rod 15 passes, at each clamping orifice 14 of the upper clamping plate 12 or the lower clamping plate 13 at which the second clamping nuts 18 are located, inserted through the clamping orifice 14, to enable cooperation of the assembly between the clamping rod 15 and the corresponding second clamping nut 18. The insulating tube 21 is then located between the upper clamping plate 12 or the lower clamping plate 13 and the insulating washer 20, and the insulating washer 20 is located between the insulating tube 21 and the second clamping nut 18.

In other words, the clamping systems 10 in FIGS. 4 to 7 allow for the addition of four insulating washers 20 and four insulating tubes 21 so as to enable different electrical potentials between a clamping plate 12, 13 and the threaded rods 15.

The various non-limitative configurations thus envisaged by this invention, are described in detail below. Obviously, for safety reasons, the installation in which the assembly 30 will be installed containing the clamping system 10 and the stack 11 is connected to the ground.

In the configuration described above with reference to FIG. 3, all that are considered are the four inlet/outlet tubes 35 for the gases produced, the upper clamping plate 12 and lower clamping plate 13, the lower terminal plate 3, the four clamping rods 15, the clamping washers 17 and the first 16 and second 18 clamping nuts are connected to the ground. Only the remaining part of the stack 11 is not connected to this potential and therefore requires the electrical insulation plate 19 between the upper clamping plate 12 and the upper terminal plate 33.

Figure 4:
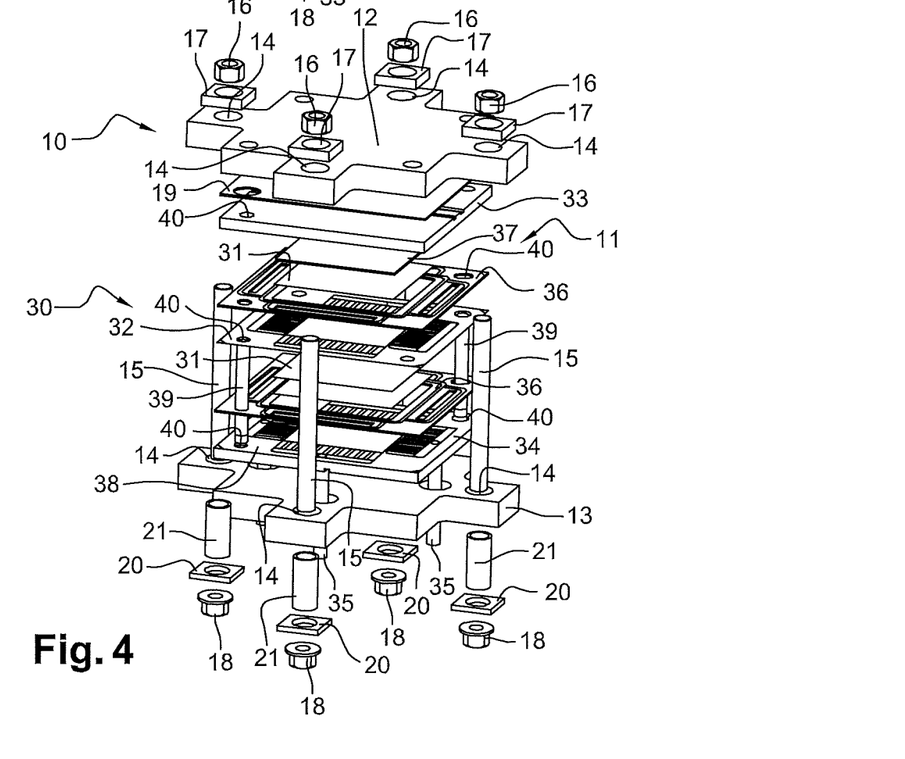
FIGS. 4 to 7 are partial perspective exploded views, each representing variant embodiments of an assembly comprising a high temperature SOEC/SOFC type solid oxide stack and a clamping system for this stack according to the invention.

In the configuration in FIG. 4, unlike the configuration in FIG. 3, insulating washers 20 and insulating tubes 21 are provided at the lower clamping plate 13 between this plate and the second clamping nuts 18. Thus, this configuration consists of modifying the configuration in FIG. 3 by requiring a different potential for the upper clamping plate 12 and the clamping system 10. The four inlet/outlet tubes 35 for gases produced, the lower terminal plate 34 and the lower clamping plate 13 are then connected to the ground. The clamping rods 15, the clamping washers 17, the clamping nuts 16 and 18 and the upper clamping plate 12 can be connected to a potential different from the ground and different from the potential of the stack 11.

Figure 5:
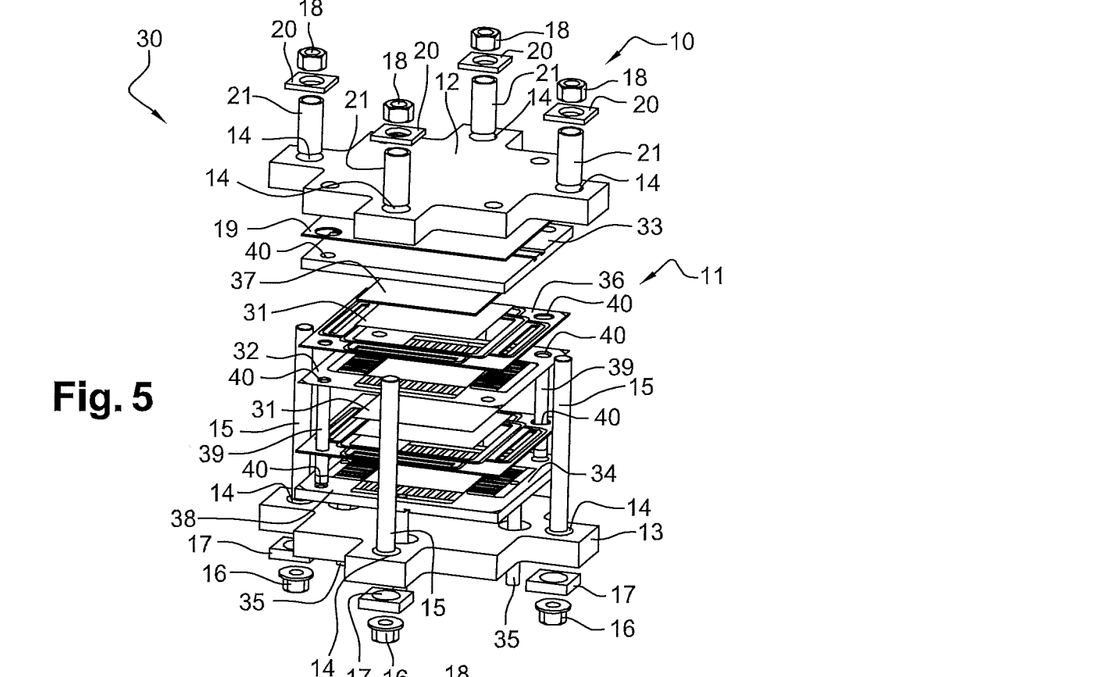

In the configuration in FIG. 5, unlike that in FIG. 4, the position of the insulating tubes 21, the insulating washers 20, the clamping washers 17 and the clamping nuts 16 and 18 is inverted. Thus, this configuration consists of requiring another potential for the upper clamping plate 12. The four inlet/outlet tubes 35 for gases produced, the lower terminal plate 34, the lower clamping plate 13, the clamping rods 15, the clamping washers 17 and the nuts 16 and 19 are connected to the ground. The upper clamping plate 12 can be connected to a potential different from the ground and different from the potential of the stack 11.

Figure 6:
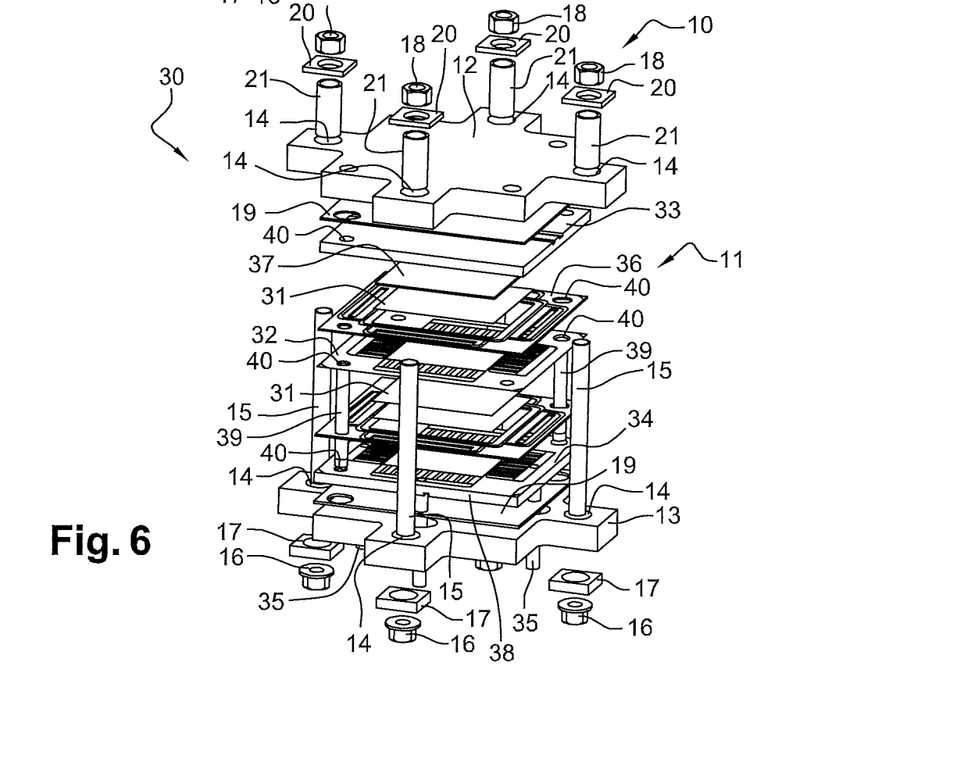

In the configuration in FIG. 6, unlike that in FIG. 5, an electrical insulation plate 19 is inserted between the lower clamping plate 13 and the lower terminal plate 34.

Figure 7:
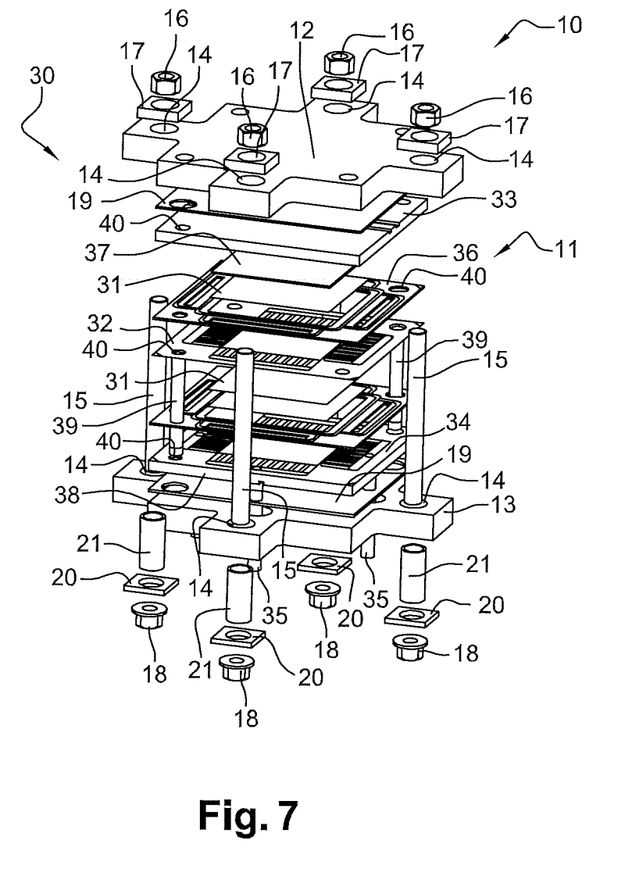

In the configuration in FIG. 7, unlike that in FIG. 4, an electrical insulation plate 19 is also inserted between the lower clamping plate 13 and the lower terminal plate 34.

Thus, these configurations in FIGS. 6 and 7 consist of wishing to completely isolate the stack 11 from the clamping system 10. There is thus an electrical insulation plate 19 between the stack 11 and each of the upper 12 and lower 13 clamping plates. If the four produced gas inlet/outlet tubes 35 are also insulated from the remaining part of the installation, the stack 11 is then said to be "floating", in other words it is not connected to the ground of the installation. In these configurations in FIGS. 6 and 7, the insulating washers 20 and the insulating tubes 21 make it possible for the two clamping plates 12 and 13 to be at different potentials.

All these possible configurations also make it possible to superpose several stacks that are independent or not electrically connected. Moreover, some configurations enable an electric power supply on the nuts of the clamping rods 15, for example through the first nuts 16 on FIG. 5. The configuration in FIG. 4 also enables an electrical power supply to a second stack 11 placed on top of the first stack 11 through second nuts 18 of this first stack 11.

We will now describe an example of a method of fabricating an SOEC/SOFC type solid oxide stack 11 operating at high temperature, making use of a clamping system 10 according to the invention.

According to this method, a preliminary step before fabrication by clamping the stack 11 by means of the clamping system 10 consists of putting the stack 11 into position between the upper 12 and lower 13 clamping plates of the clamping system 10 with the presence of the electrical insulation plate(s) 19 between the stack 11 and one or two additional upper 12 and lower 13 clamping plates.

Thus, some parts of the self-contained clamping system 10 according to the invention should be put into place at the time of assembly of the stack 11, before actual fabrication. As described below, the invention aims to maintain the force applied by compression, particularly be gravity or by a ram, at the time of fabrication by the external linkage of the clamping system 10, namely the clamping rods 15, the first 16 and second 18 clamping nuts and the clamping washers 17.

The fabrication step by clamping the stack 11 then comprises a compression step of the stack 11. More precisely, the clamping applied during this fabrication step by clamping is achieved by an external load, preferably of the gravity type or using a ram.

During this compression, the two guide columns 39, preferably made of ceramic, guide the compression of the stack 11. The clamping applied during the fabrication step by clamping is for example a distributed weight equal to between 2 and 2.5 kg/(cm² of electrochemical cell). This clamping deforms the contact layers 37 and 38, and the seals, to subsequently guarantee good electrical contact and a good seal.

After conditioning (in temperature) while clamped, preferably by gravity, the threaded clamping rods 15, the first 16 and second 18 clamping nuts and the clamping washers 17 are put into place on the clamping system 10. Note that the nuts 16 and 18 are simply brought into contact without additional clamping.

Thus, clamping by compression of the stack 11 is stopped and removed. The result is then that this same force is transferred to the linkage of the clamping system 10, neglecting the elastic elongation of the four clamping rods 15, with a diameter of about 16 mm, under 200 kg.

The stack 11 obtained can then be transferred from the fabrication installation to a functional installation, for example to produce hydrogen, synthetic gas and/or electricity depending on the mode chosen for this stack 11. All that is then necessary is to plug in the four metallic produced gas inlet/outlet tubes 35 and the current power supplies to enable operation on the functional installation, such that the clamping system 10 according to the invention is of the "plug and play" type.

Obviously, the invention is not limited to the example embodiments that have just been described. An expert in the subject can make various modifications to it.

The invention claimed is:

1. An assembly, comprising:
    a Solid Oxide Electrolyser Cell/Solid Oxide Fuel Cell (SOEC/SOFC) type solid oxide stack, comprising
        a plurality of electrochemical cells each including a cathode, an anode, and an electrolyte intercalated between the cathode and the anode,
        a plurality of intermediate interconnectors each formed between two adjacent electrochemical cells,
        an upper terminal plate and a lower terminal plate, between which the plurality of electrochemical cells and the plurality of intermediate interconnectors are clamped;
    a clamping system for the SOEC/SOFC type solid oxide stack, comprising
        an upper clamping plate and a lower clamping plate between which the SOEC/SOFC type solid oxide stack is clamped, each of the upper clamping plate and the lower clamping plate comprising at least one clamping orifice, each of the upper and lower terminal plates being in contact with one of the upper and lower clamping plates or in contact with at least one electrical insulation plate of the clamping system, the at least one electrical insulation plate located between the SOEC/SOFC type solid oxide stack and at least one of the upper and lower clamping plates,
        at least one clamping rod that extends through a clamping orifice in the upper clamping plate and through a corresponding clamping orifice in the lower clamping plate, the at least one clamping rod configured to connect the upper and the lower clamping plates to each other and to ground,
        clamping means at each clamping orifice of the upper and lower clamping plates, the clamping means configured to cooperate with the at least one clamping rod to connect the upper and lower clamping plates to each other, the clamping means comprising at least one first clamping nut associated with at least one clamping washer at each clamping orifice in at least one of the upper and lower clamping plates, the clamping means configured to cooperate with the at least one clamping rod extended through a corresponding clamping orifice;
    the at least one clamping rod and the at least one first clamping nut being made from a super alloy based on nickel,
    the at least one clamping washer being made of refractory austenitic steel and the upper clamping plate and the lower clamping plate being made of austenitic refractory steel.

2. The assembly according to claim 1, wherein difference in expansion between the at least one clamping rod and the SOEC/SOFC type solid oxide stack is compensated by expansion of the lower and upper clamping plates and the at least one clamping washer.

3. The assembly according to claim 1, wherein the upper clamping plate and the lower clamping plate each have a thickness of between 20 and 30 mm.

4. The assembly according to claim 1, wherein the at least one clamping rod is threaded, and wherein the clamping means comprises at least one second clamping nut at each clamping orifice in one of the upper and lower clamping plates, the at least one second clamping nut configured to cooperate with the at least one clamping rod inserted through the respective clamping orifice, and comprises the at least one first clamping nut associated with the at least one clamping washer at each clamping orifice in the other one of the upper and lower clamping plates, the at least one first clamping nut configured to cooperate with the at least one clamping rod inserted through the respective clamping orifice, the at least one clamping washer being located between the at least one first clamping nut and the other one of the upper and lower clamping plates.

5. The assembly according to claim 1, wherein each of the upper and lower clamping plates comprises at least two clamping orifices, and further comprising:
    at least two clamping rods, each of which extends through a clamping orifice in the upper clamping plate and through a corresponding clamping orifice in the lower clamping plate to connect the upper and lower clamping plates to each other;
    the clamping means at each clamping orifice in the upper and lower clamping plates, the clamping means configured to cooperate with the at least two clamping rods to connect the upper and lower clamping plates to each other;
    the at least two clamping rods being threaded, and the clamping means comprising a second clamping nut at each clamping orifice in one of the upper and lower clamping plates, the second clamping nut configured to cooperate with the corresponding clamping rod inserted through the respective clamping orifice, and comprising the at least one first clamping nut associated with a clamping washer at each clamping orifice in the other one of the upper and lower clamping plates, the at least one first clamping nut configured to cooperate with the clamping rod inserted through the respective clamping orifice, the clamping washer being located between the at least one first clamping nut and the other one of the upper and lower clamping plates.

6. The assembly according to claim 1, Wherein the at least one electrical insulation plate is made of mica.

7. The assembly according to claim 1, wherein the SOEC/SOFC type solid oxide stack further comprises a first contact layer between the upper terminal plate and an assembly of the electrochemical cells and the intermediate interconnectors, and a second contact layer between the lower terminal plate and the assembly of the electrochemical cells and the intermediate interconnectors.

8. The assembly according to claim 7, wherein one of the first and second contact layers comprises a ceramic oxide layer, and wherein the other one of the first and second contact layers comprises a layer made of nickel.

9. The assembly according to any claim 1, wherein the SOEC/SOFC type solid oxide stack further comprises at least two guide columns extending through guide orifices formed in at least the upper terminal plate, the lower terminal plate, the intermediate interconnectors, and the upper clamping plate, the at least two guide columns configured to guide the SOEC/SOFC type solid oxide stack in compression during fabrication.

10. A method for fabrication of the SOEC/SOFC type solid oxide stack of the assembly according to claim 1, using the clamping system of the assembly, the method comprising fabrication by external clamping of the SOEC/SOFC type solid oxide stack through the clamping system.

11. The method according to claim 10, further comprising, prior to the fabrication by external clamping, positioning the SOEC/SOFC type solid oxide stack between the upper and lower clamping plates of the clamping system with presence of the at least one electrical insulation plate located between the SOEC/SOFC type solid oxide stack and at least one of the upper and lower clamping plates.

12. The method according to claim 10, wherein the fabrication by external clamping includes compression of the SOEC/SOFC type solid oxide stack, when temperature increases from about 20° C. to a temperature of more than 800° C.

13. The method according to claim 12, wherein the compression applied during the fabrication by external clamping is achieved by an external load.

14. The method according to claim 12, wherein the compression applied during the fabrication by external clamping is a distributed weight equal to between 2 and 2.5 kg/cm$^2$ of electrochemical cell.

15. The method according to claim 13, wherein the at least one clamping rod in the clamping system is threaded, and wherein the clamping means comprises at least one second clamping nut at each clamping orifice in one of the upper and lower clamping plates, the at least one second clamping nut configured to cooperate with the at least one clamping rod inserted through the respective clamping orifice, and comprising the at least one first clamping nut associated with the at least one clamping washer at each clamping orifice in the other one of the upper and lower clamping plates, the at least one first clamping nut configured to cooperate with the at least one clamping rod inserted through the respective clamping orifice, the at least one clamping washer being located between the at least one first clamping nut and the other one of the upper and lower clamping plates, and wherein, after cooling to a temperature of about 20° C. during the compression of the SOEC/SOFC type solid oxide stack, the at least one clamping rod, the at least one second clamping nut, the at least one first clamping nut, and the at least one clamping washer are put into place on the clamping system, the at least one first clamping nut and the at least one second clamping nut being placed in the clamping system without additional clamping.

16. The method according to claim 15, wherein, after placement of the at least one threaded clamping rod, the at least one second clamping nut, the at least one first clamping nut, and the at least one clamping washer on the clamping system, compression of the SOEC/SOFC type solid oxide stack is interrupted, by removing the external load such that force previously applied by the external clamping is transferred onto the clamping means.

* * * * *